US007245671B1

(12) United States Patent
Chen et al.

(10) Patent No.: US 7,245,671 B1
(45) Date of Patent: Jul. 17, 2007

(54) PREPROCESSING SIGNAL LAYERS IN A LAYERED MODULATION DIGITAL SIGNAL SYSTEM TO USE LEGACY RECEIVERS

(75) Inventors: Ernest C. Chen, San Pedro, CA (US); Tiffany S. Furuya, Los Angeles, CA (US); Philip R. Hilmes, Santa Monica, CA (US); Joseph Santoru, Agoura Hills, CA (US)

(73) Assignee: The DirecTV Group, Inc., El Segundo, CA (US)

( * ) Notice: Subject to any disclaimer, the term of this patent is extended or adjusted under 35 U.S.C. 154(b) by 696 days.

(21) Appl. No.: 10/068,039

(22) Filed: Feb. 5, 2002

Related U.S. Application Data

(63) Continuation-in-part of application No. 10/068,047, filed on Feb. 5, 2002, and a continuation-in-part of application No. 09/844,401, filed on Apr. 27, 2001.

(51) Int. Cl.
H04L 27/233 (2006.01)
(52) U.S. Cl. .................................. 375/316
(58) Field of Classification Search ............... 375/316, 375/320, 343, 261, 235, 298, 349, 308, 377, 375/279, 281; 342/152; 332/103; 329/304, 329/308; 370/206; 455/17
See application file for complete search history.

(56) References Cited

U.S. PATENT DOCUMENTS 3,076,180 A 1/1963 Havens et al.
3,383,598 A 5/1968 Sanders .................. 375/308
3,878,468 A 4/1975 Falconer et al.

(Continued)

FOREIGN PATENT DOCUMENTS

DE 3642213 12/1986

(Continued)

OTHER PUBLICATIONS

Chen, "International Journal of Satellite Communications and Networking", vol. 22, Issue 3, pp. 341-365, Special Issue: Special Issue on The DVB-S2 Standard for Broadband Satellite Systems. Issue Edited by Ulrich Reimers, Alberto Morello. Published Online: Jun. 16, 2004.*

(Continued)

*Primary Examiner*—Temesghen Ghebretinsae
*Assistant Examiner*—Juan Alberto Torres
(74) *Attorney, Agent, or Firm*—Georgann S. Grunebach

(57) ABSTRACT

Systems and methods for receiving non-coherent layered modulation signals are presented. An exemplary apparatus comprises a tuner for receiving a layered signal and producing a layered in-phase signal and a layered quadrature signal therefrom, an analog-to-digital converter for digitizing the layered in-phase signal and the layered quadrature signal, a processor for decoding the layered in-phase signal and the layered quadrature signal to produce a single layer in-phase signal and a single layer quadrature signal, a digital-to-analog encoder for converting the single layer in-phase signal and the single layer quadrature signal to a single layer in-phase analog signal and a single layer quadrature analog signal and a modulator for modulating the single layer in-phase analog signal and the single layer quadrature analog signal to produce a single layer signal.

9 Claims, 8 Drawing Sheets

U.S. PATENT DOCUMENTS

| | | | |
|---|---|---|---|
| 3,879,664 A | 4/1975 | Monsen | |
| 3,974,449 A | 8/1976 | Falconer | |
| 4,039,961 A * | 8/1977 | Ishio et al. | 329/308 |
| 4,068,186 A | 1/1978 | Sato et al. | |
| 4,213,095 A | 7/1980 | Falconer | |
| 4,253,184 A | 2/1981 | Gitlin et al. | |
| 4,283,684 A | 8/1981 | Satoh | |
| 4,384,355 A | 5/1983 | Werner | |
| RE31,351 E | 8/1983 | Falconer | |
| 4,416,015 A | 11/1983 | Gitlin | |
| 4,500,984 A | 2/1985 | Shimbo et al. | |
| 4,519,084 A | 5/1985 | Langseth | |
| 4,594,725 A | 6/1986 | Desperben et al. | |
| 4,628,507 A | 12/1986 | Otani | |
| 4,637,017 A | 1/1987 | Assal et al. | |
| 4,647,873 A | 3/1987 | Beckner et al. | |
| 4,654,863 A | 3/1987 | Belfield et al. | |
| 4,670,789 A | 6/1987 | Plume | |
| 4,709,374 A | 11/1987 | Farrow | |
| 4,800,573 A | 1/1989 | Cupo | |
| 4,835,790 A | 5/1989 | Yoshida et al. | |
| 4,847,864 A | 7/1989 | Cupo | |
| 4,860,315 A | 8/1989 | Hosoda et al. | |
| 4,878,030 A | 10/1989 | Vincze | |
| 4,896,369 A | 1/1990 | Adams et al. | |
| 4,918,708 A | 4/1990 | Pottinger et al. | |
| 4,993,047 A | 2/1991 | Moffat et al. | |
| 5,088,110 A | 2/1992 | Bonnerot et al. | |
| 5,111,155 A | 5/1992 | Keate et al. | |
| 5,121,414 A | 6/1992 | Levine et al. | |
| 5,199,047 A | 3/1993 | Koch | |
| 5,221,908 A | 6/1993 | Katz et al. | |
| 5,229,765 A | 7/1993 | Gardner | |
| 5,233,632 A | 8/1993 | Baum et al. | |
| 5,285,480 A | 2/1994 | Chennakeshu et al. | |
| 5,317,599 A | 5/1994 | Obata | |
| 5,329,311 A | 7/1994 | Ward et al. | 348/186 |
| 5,430,770 A | 7/1995 | Abbey | 375/349 |
| 5,450,623 A | 9/1995 | Yokoyama et al. | 455/226.1 |
| 5,467,197 A | 11/1995 | Hoff | |
| 5,493,307 A | 2/1996 | Tsujimoto | |
| 5,555,257 A | 9/1996 | Dent | |
| 5,557,067 A | 9/1996 | Messelhi | |
| 5,577,067 A * | 11/1996 | Zimmerman | 375/224 |
| 5,577,087 A | 11/1996 | Furuya | 375/377 |
| 5,579,344 A | 11/1996 | Namekata | |
| 5,581,229 A | 12/1996 | Hunt | |
| 5,602,868 A | 2/1997 | Wilson | 375/219 |
| 5,603,084 A | 2/1997 | Henry et al. | |
| 5,606,286 A | 2/1997 | Bains | |
| 5,625,640 A | 4/1997 | Palmer et al. | |
| 5,642,358 A | 6/1997 | Dent | |
| 5,648,955 A | 7/1997 | Jensen et al. | |
| 5,732,113 A | 3/1998 | Schmidl et al. | |
| 5,793,818 A | 8/1998 | Claydon et al. | |
| 5,815,531 A | 9/1998 | Dent | 375/298 |
| 5,819,157 A | 10/1998 | Ben-Efraim et al. | |
| 5,828,710 A | 10/1998 | Beale | |
| 5,848,060 A | 12/1998 | Dent | |
| 5,870,443 A | 2/1999 | Rahnema | |
| 5,940,025 A | 8/1999 | Koehnke et al. | |
| 5,956,373 A | 9/1999 | Goldston et al. | |
| 5,960,040 A | 9/1999 | Cai et al. | 375/279 |
| 5,963,845 A | 10/1999 | Floury et al. | |
| 5,966,048 A | 10/1999 | Thompson | |
| 5,966,186 A | 10/1999 | Shigihara et al. | 348/520 |
| 5,966,412 A | 10/1999 | Ramaswamy | 375/341 |
| 5,970,098 A | 10/1999 | Herzberg | |
| 5,987,068 A | 11/1999 | Cassia et al. | 375/281 |
| 5,995,832 A | 11/1999 | Mallinckrodt | |
| 5,999,793 A * | 12/1999 | Ben-Efraim et al. | 725/68 |
| 6,008,692 A | 12/1999 | Escartin | |
| 6,018,556 A | 1/2000 | Janesch et al. | |
| 6,021,159 A | 2/2000 | Nakagawa | |
| 6,028,894 A | 2/2000 | Oishi et al. | 375/227 |
| 6,032,026 A | 2/2000 | Seki et al. | 455/63.1 |
| 6,034,952 A | 3/2000 | Dohi et al. | 370/335 |
| 6,052,586 A | 4/2000 | Karabinis | |
| 6,055,278 A | 4/2000 | Ho et al. | |
| 6,061,393 A | 5/2000 | Tsui et al. | |
| 6,084,919 A | 7/2000 | Kleider et al. | |
| 6,108,374 A | 8/2000 | Balachandran et al. | 375/227 |
| 6,125,148 A | 9/2000 | Frodigh et al. | |
| 6,128,357 A | 10/2000 | Lu et al. | |
| 6,131,013 A | 10/2000 | Bergstrom et al. | |
| 6,140,809 A | 10/2000 | Doi | 324/76.24 |
| 6,141,534 A | 10/2000 | Snell et al. | |
| 6,144,708 A | 11/2000 | Maruyama | |
| 6,166,601 A | 12/2000 | Shalom et al. | |
| 6,178,158 B1 | 1/2001 | Suzuki et al. | |
| 6,188,717 B1 | 2/2001 | Kaiser et al. | |
| 6,212,360 B1 | 4/2001 | Fleming et al. | |
| 6,219,095 B1 | 4/2001 | Zhang et al. | 348/192 |
| 6,249,180 B1 | 6/2001 | Maalej et al. | |
| 6,266,534 B1 | 7/2001 | Raith et al. | |
| 6,272,679 B1 | 8/2001 | Norin | |
| 6,275,678 B1 | 8/2001 | Bethscheider et al. | 455/17 |
| 6,297,691 B1 * | 10/2001 | Anderson et al. | 329/300 |
| 6,304,594 B1 | 10/2001 | Salinger | |
| 6,307,435 B1 | 10/2001 | Nguyen et al. | |
| 6,320,919 B1 | 11/2001 | Khayrallah et al. | |
| 6,325,332 B1 | 12/2001 | Cellier et al. | |
| 6,330,336 B1 | 12/2001 | Kasama | |
| 6,333,924 B1 | 12/2001 | Porcelli et al. | |
| 6,366,309 B1 | 4/2002 | Siegle | |
| 6,369,648 B1 | 4/2002 | Kirkman | |
| 6,389,002 B1 | 5/2002 | Schilling | |
| 6,411,659 B1 | 6/2002 | Liu et al. | |
| 6,411,797 B1 | 6/2002 | Estinto | |
| 6,426,822 B1 | 7/2002 | Winter et al. | |
| 6,429,740 B1 | 8/2002 | Nguyen et al. | |
| 6,433,835 B1 | 8/2002 | Hartson et al. | |
| 6,477,398 B1 | 11/2002 | Mills | |
| 6,501,804 B1 | 12/2002 | Rudolph et al. | |
| 6,515,713 B1 | 2/2003 | Nam | |
| 6,535,497 B1 | 3/2003 | Raith | |
| 6,535,801 B1 | 3/2003 | Geier et al. | |
| 6,574,235 B1 * | 6/2003 | Arslan et al. | 370/464 |
| 6,597,750 B1 | 7/2003 | Knutson et al. | |
| 6,718,184 B1 | 4/2004 | Aiken et al. | |
| 6,731,700 B1 | 5/2004 | Yakhnich et al. | |
| 6,741,662 B1 | 5/2004 | Francos et al. | |
| 6,745,050 B1 | 6/2004 | Forsythe et al. | |
| 6,775,521 B1 | 8/2004 | Chen | |
| 6,892,068 B2 | 5/2005 | Karabinis et al. | |
| 6,934,314 B2 | 8/2005 | Harles et al. | |
| 6,970,496 B1 | 11/2005 | Ben-Bassat et al. | |
| 2001/0012322 A1 | 8/2001 | Nagaoka et al. | |
| 2001/0024479 A1 | 9/2001 | Samarasooriya | |
| 2002/0006795 A1 | 1/2002 | Norin et al. | |
| 2002/0071506 A1 | 6/2002 | Lindquist et al. | |
| 2002/0158619 A1 | 10/2002 | Chen | |
| 2002/0176516 A1 | 11/2002 | Jeske et al. | |
| 2003/0002471 A1 | 1/2003 | Crawford et al. | |
| 2003/0138037 A1 | 7/2003 | Kaku et al. | |
| 2004/0110467 A1 | 6/2004 | Wang | |
| 2004/0146296 A1 | 7/2004 | Gerszberg et al. | |
| 2005/0008100 A1 | 1/2005 | Chen | |
| 2006/0056541 A1 | 3/2006 | Chen et al. | |

FOREIGN PATENT DOCUMENTS

| | | |
|---|---|---|
| EP | 0222076 | 8/1986 |
| EP | 0 238 822 A2 | 9/1987 |

| | | |
|---|---|---|
| EP | 0 356 096 A2 | 2/1990 |
| EP | 0929164 | 7/1999 |
| FR | 2696295 | 4/1994 |
| JP | 2-5631 | 1/1990 |
| JP | 2-95033 | 4/1990 |
| JP | 03139027 | 6/1991 |
| JP | 5-41683 | 2/1993 |
| JP | 5-114878 | 5/1993 |
| JP | 5-252084 | 9/1993 |
| JP | 07-038615 | 2/1995 |
| WO | WO 99/20001 | 4/1999 |
| WO | WO 02/073817 | 9/2002 |
| WO | WO 2005/074171 | 8/2005 |
| WO | WO 2005/086444 | 9/2005 |

OTHER PUBLICATIONS

Ramchandran, Kannan et al., *Multiresolution Broadcast for Digital HDTV Using Joint Source/Channel Coding*, IEEE, vol. 11, No. 1, Jan. 1993, pp. 6-22.

Gianluca Mazzini, *Power Division Multiple Access*, IEEE, 1998, pp. 543-546.

A.A.M. Saleh et al., *Adaptive Linearization of Power Amplifiers in Digital Radio Systems*, Bell System Technical Journal, 1983, vol. 62, pp. 1019-1033.

*Earth Station Technology*, 1986, pp. 404-412.

Janssen G J M; Slimane S B: "Performance of a Multiuser Detector for M-PSK Signals Based on Successive Cancellation", ICC 2001, 2001 IEEE International Conference on Communications, Conference Record, Helsinky, Finland, Jun. 11-14, 2001, XP010552960.

Slimane S B; Jansseen G J M: "Power Optimization of M-PSK Cochannel Signals for a Narrowband Multiuser Detector", 2001 IEEE Pacific Rim Conference on Communications, Computer and Signal Processing, Victoria BC, Canada, Aug. 26-28, 2001, XP010560334.

Soong, A C K; Krzymien W A: "Performance of a Reference Symbol Assisted Multistage Successive Interference Cancelling Receiver in a Multicell CDMA Wireless System", Conference Record, Communication Theory Mini-Conference GlobeCom '95, IEEE Singapore Nov. 13-17, 1995, XP010159490.

Arslan H; Molnar K: "Iterative Co-channel Interference Cancellation in Narrowband Mobile Radio Systems", Emerging Technologies Symposium: Broadband, Wireless Internet Access, 2000 IEEE Apr. 10-11, 2000, Piscataway, New Jersey, USA, XP010538900.

Meyr, Heinrich et al.; "Digital Communication Recievers: Synchronization, Channel Estimation, and Signal Processing"; 1998, John Wiley & Sons, Inc.; pp. 212-213 and 217-218; XP002364874.

Fant, T. et al.; "Fourth-Power Law Clock Recovery with Prefiltering"; Proceedings of the International Conference on Communications (ICC); Geneva; May 23-26, 1993; New York; IEEE; US; vol. 3; May 23, 1993; pp. 811-815 XP010137089, ISBN: 0-7803-0950-2; Section I, Introduction.

Wolcott, Ted J. et al.; "Uplink-Noise Limited Satellite Channels"; IEEE 1995; pp. 717-721; XP-00580915.

Seskar, Ivan et al.: "Implementation Aspects for Successive Interface Cancellation in DS/CDMA Systems"; Wireless Networks; 1998; pp. 447-452.

Meyr, Heinrich: Moeneclaey, Marc; Fechtel, Stefan A.; "Digital Communication Recievers: Synchronization, Channel Estimation and Signal Processing"; 1998; pp. 610-612; John Wiley & Sons, Inc. Publisher; US; XP002364876.

The Authoritive Dictionary of IEEE Standards Terms; Seventh Edition, pp. 1047 - definition of "signal".

\* cited by examiner

PREPROCESSING SIGNAL LAYERS IN A LAYERED MODULATION DIGITAL SIGNAL SYSTEM TO USE LEGACY RECEIVERS

CROSS-REFERENCE TO RELATED APPLICATIONS

This continuation-in-part application claims priority under 35 U.S.C. §120 from U.S. patent application Ser. No. 09/844,401, filed Apr. 27, 2001, and entitled "LAYERED MODULATION FOR DIGITAL SIGNALS" and from U.S. patent application Ser. No. 10/068,047, filed Feb. 5, 2002, and entitled "DUAL LAYER SIGNALPROCESSING IN A LAYERED MODULATION DIGITAL SIGNAL SYSTEM", which are both incorporated by reference herein.

BACKGROUND OF THE INVENTION

1. Field of the Invention

The present invention relates generally to systems for receiving digital signals, and in particular, to systems for receiving layered modulation in digital signals.

2. Description of the Related Art

As various digital signal communication systems and services evolve, there is a burgeoning demand for increased data throughput and added services. However, it is more difficult to implement improvements in old systems and new services when it is necessary to replace existing legacy hardware, such as transmitters and receivers. New systems and services are advantaged when they can utilize existing legacy hardware. In the realm of wireless communications, this principle is further highlighted by the limited availability of electromagnetic spectrum. Thus, it is not possible (or at least not practical) to merely transmit enhanced or additional data at a new frequency.

The conventional method of increasing spectral capacity is to move to a higher-order modulation, such as from quadrature phase shift keying (QPSK) to eight phase shift keying (8PSK) or sixteen quadrature amplitude modulation (16QAM). Unfortunately, QPSK receivers cannot demodulate 8PSK or 16QAM signals. As a result, legacy customers with QPSK receivers must upgrade their receivers in order to continue to receive any signals transmitted with an 8PSK or 16QAM modulation.

Layered modulation enables systems and methods of transmitting signals to accommodate enhanced and increased data throughput without requiring additional frequency bands. Systems using layered modulation can provide enhanced and increased throughput signals for new receivers while remaining compatible with legacy receivers. Newer layered modulation techniques (such as detailed in U.S. patent application Ser. No. 09/844,401, filed Apr. 27, 2001, and entitled "LAYERED MODULATION FOR DIGITAL SIGNALS") also provide the unique advantage of allowing transmission signals to be upgraded from a source separate from the legacy transmitter. In other words, the layered signals can be asynchronous and/or non-coherent.

Related receiver systems for layered signals have also been described, such as those found in U.S. Pat. No. 4,039,961, which is incorporated by reference herein. However, such receiver systems are based on analog circuits, synchronized by a voltage control oscillator. In addition, such receiver systems are limited because they are designed to only receive coherent layered signals, i.e. signals that are synchronously produced.

Accommodating legacy receivers is also an important consideration when layered modulation is employed to enhance a preexisting system. Although proper design of the layered modulation signal can enable legacy receivers to receive legacy layers of the signal, the new signal layers will not be accessible by legacy receivers. In addition, it may not always be possible (or preferable) to accommodate the legacy receivers in designing the new layered modulation signal. In which case, the legacy receivers would be rendered incompatible with the new layered modulation signal.

There is a need for systems and methods for receiving and processing the layered modulation signals. There is also a need for systems and methods to enable legacy receivers to receive all layers of the layered signal. There is further a need for systems and methods which enable legacy receivers to be operable if the layered modulation signal is otherwise incompatible with the legacy receiver. The present invention meets these needs.

SUMMARY OF THE INVENTION

The present invention provides a flexible and expandable apparatus that can be implemented with high speed logic circuit technology capable of performing demodulator functions and processing of received layered modulation signals in real-time. The invention utilizes high speed digitization of the incoming signal to prepare it for further high-speed digital processing. The invention enables a receive system architecture wherein the incoming signal is split and separately directed to distinct integrated receiver/decoders (IRDs). The system facilitates compatibility with legacy IRDs. One legacy IRD can be used to receive the upper modulation layer as it would receive a conventional unlayered signal. In this IRD the lower modulation layer is ignored as noise. A second legacy IRD receives a signal that has been preprocessed to extract and convert the lower modulation signal to a legacy IRD compatible signal.

An exemplary apparatus comprises a tuner for receiving a layered signal and producing a layered in-phase signal and a layered quadrature signal therefrom, an analog-to-digital converter for digitizing the layered in-phase signal and the layered quadrature signal, a processor for decoding the layered in-phase signal and the layered quadrature signal to produce a single layer in-phase signal and a single layer quadrature signal, a digital-to-analog encoder for converting the single layer in-phase signal and the single layer quadrature signal to a single layer in-phase analog signal and a single layer quadrature analog signal and a modulator for modulating the single layer in-phase analog signal and the single layer quadrature analog signal to produce a single layer signal.

Preferably, the layered signal is designed to be compatible with a legacy receiver such that at least one signal layer is decodeable directly from the layered signal with the legacy receiver. The apparatus produces a single layer signal that is also decodeable with a legacy receiver.

To facilitate high speed signal processing, the processor can comprise a logic circuit. Decoding by the processor can start with match filtering the layered in-phase signal and the layered quadrature signal.

In one embodiment, the processor demodulates and decodes an upper layer signal from the layered in-phase signal and the layered quadrature signal. The processor further produces an ideal noise free upper layer signal including an ideal in-phase upper layer signal and an ideal quadrature upper layer signal from the decoded upper layer signal and subtracts the ideal in-phase upper layer signal and the ideal quadrature upper layer signal from the layered in-phase signal and the layered quadrature signal, respectively, to produce the single lower layer in-phase signal and the single lower layer quadrature signal. In a further embodiment, the layered in-phase signal and the layered quadrature signal are delayed to synchronize the subtraction.

In other embodiments, producing the ideal upper layer signal comprises signal processing the ideal in-phase upper layer signal and the ideal quadrature upper layer signal. Signal processing the ideal upper layer can include many elements, including pulse shaping the ideal in-phase upper layer signal and the ideal quadrature upper layer signal. Signal mapping to account for transmission distortions of the layered analog signal can also be applied to the ideal in-phase upper layer signal and the ideal quadrature upper layer signal. The ideal upper layer signal can also be processed by amplitude and phase matching with the layered signal to improve signal subtraction results.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which show, by way of illustration, several embodiments of the present invention. It is understood that other embodiments may be utilized and structural changes may be made without departing from the scope of the present invention.

1. Overview

The present invention provides for the reception of non-coherent legacy layered modulation signals using legacy receivers. The signal layers can be independently modulated and coded. Signal layers which are otherwise incompatible with the legacy receiver are preprocessed in a layered modulation decoder to convert them to a compatible format. Thus, all layers of the layered modulation signal can be received by splitting the incoming signal and directing it to different legacy receivers, preprocessing as necessary to extract the desired layer and present it in a compatible format. Preferably, at least one layer of the signal is compatible with a legacy receiver without being preprocessed.

2. Layered Signals

Figure 1A:
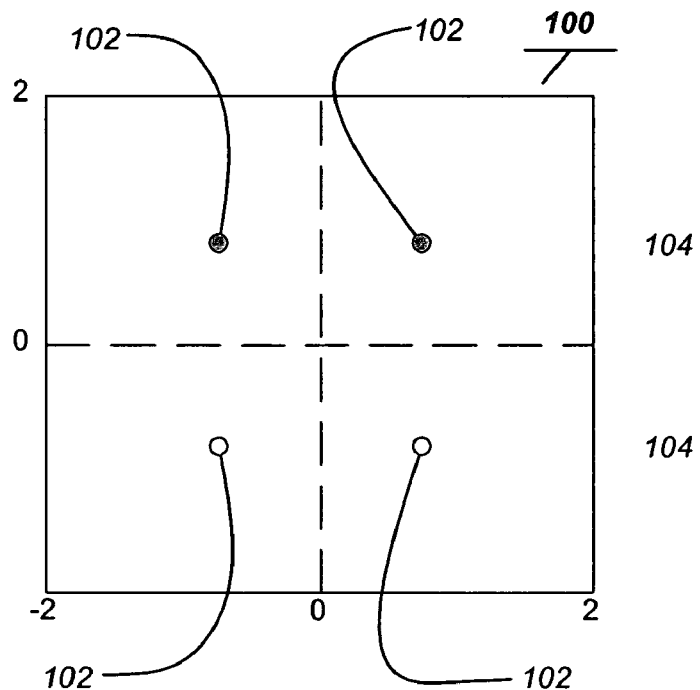
FIGS. 1A–1C illustrate the relationship of signal layers in a layered modulation transmission.
Figure 1B:
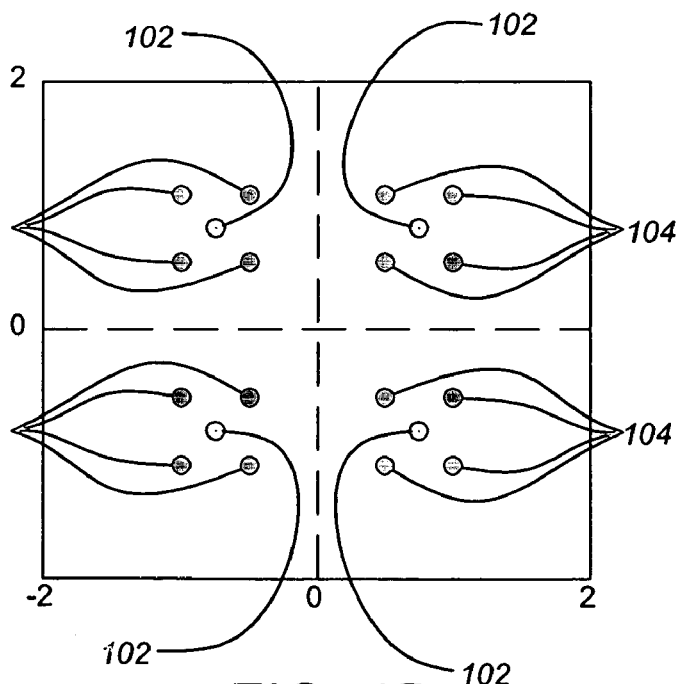
Figure 1C:
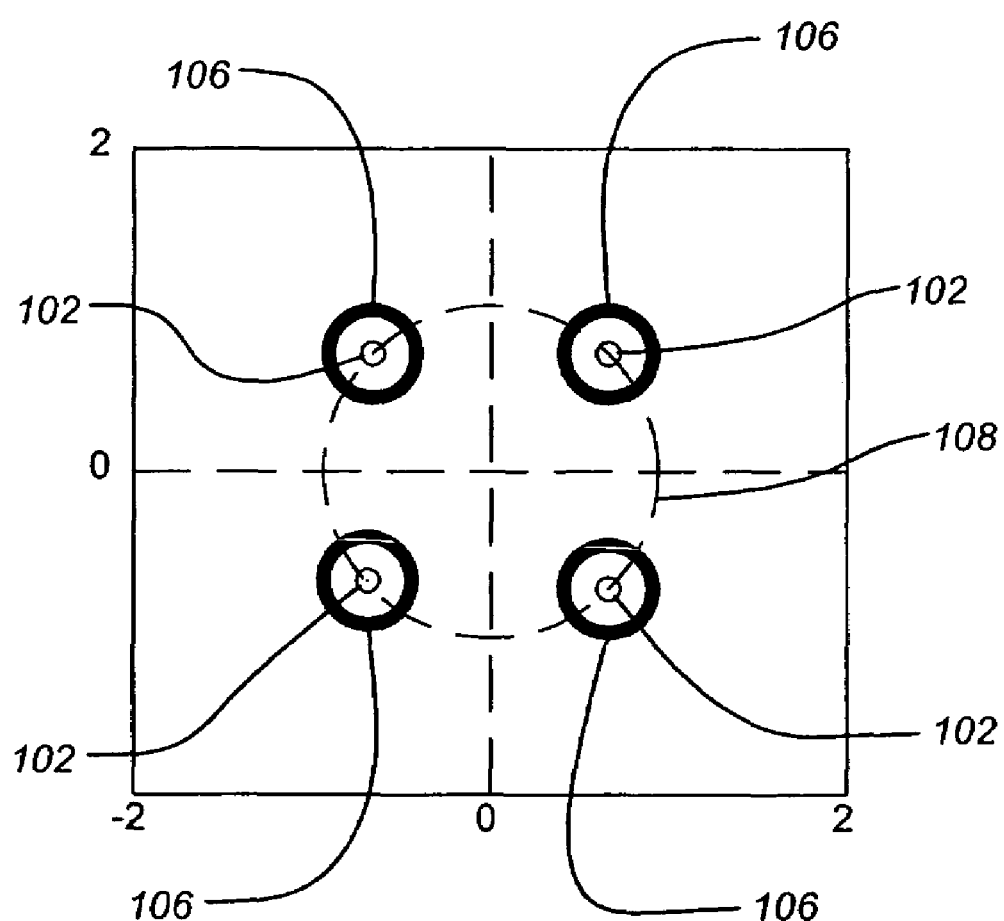

FIGS. 1A–1C and FIGS. 2A–2C illustrate and QPSK signal format in a two-layer example. FIGS. 1A–1C illustrate the basic relationship of signal layers in a layered modulation transmission. FIG. 1A illustrates a upper layer signal constellation 100 of a transmission signal showing the signal points or symbols 102. FIG. 1B illustrates the lower layer signal constellation of symbols 104 over the upper layer signal constellation 100 where the layers are coherent.

FIG. 1C illustrates a lower signal layer 106 of a lower transmission layer over the upper layer constellation where the layers may be non-coherent. The lower layer 106 rotates about the upper layer constellation 102 due to the relative modulating frequencies of the two layers in a non-coherent transmission. Both the upper and lower layers rotate about the origin due to the upper layer modulation frequency as described by path 108.

Figure 2A:
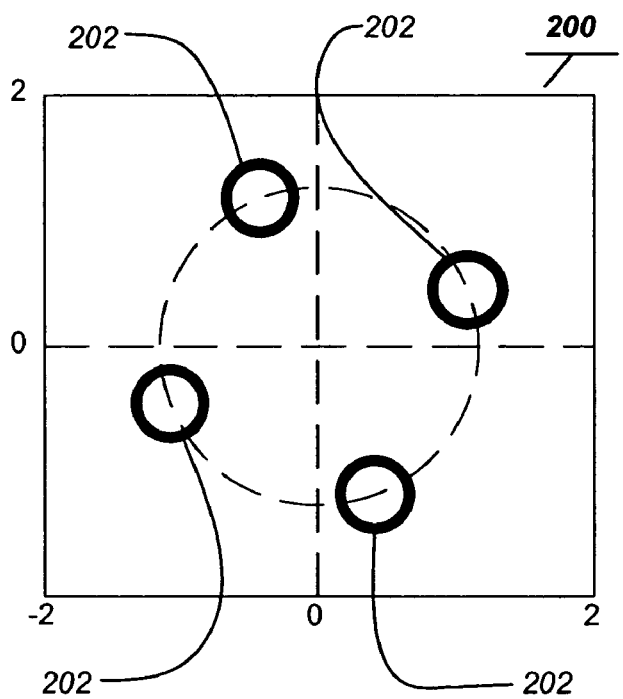
FIGS. 2A–2C illustrate a signal constellation of a second transmission layer over a first transmission layer non-coherently.
Figure 2B:
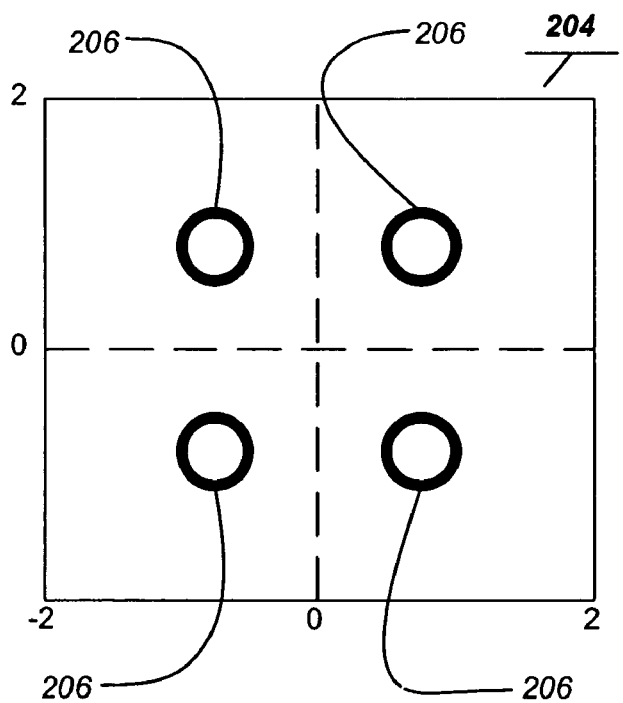
Figure 2C:
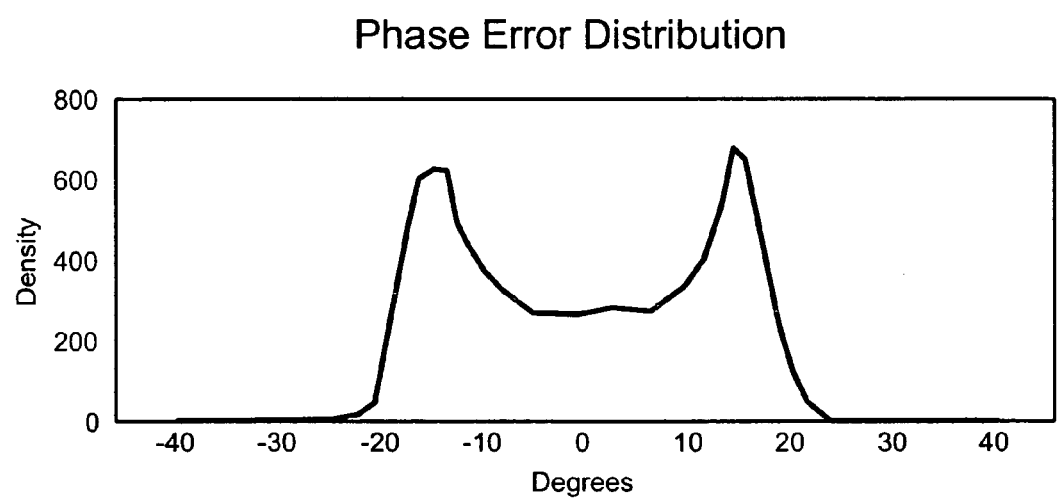

FIGS. 2A–2C illustrate a signal constellation of a lower transmission layer over the upper transmission layer after upper layer demodulation. FIG. 2A shows the constellation 200 before the upper carrier recovery loop (CRL) and FIG. 2B shows the constellation 200 after CRL. In this case, the signal points of the lower layer are rings 202. FIG. 2C depicts a phase distribution of the received signal with respect to nodes 102. As mentioned above, relative modulating frequencies cause the lower layer constellation to rotate around the nodes of the upper layer constellation. After the lower layer CRL this rotation is eliminated. The radius of the lower layer constellation is determined by its power level. The thickness of the rings 202 is determined by the carrier to noise ratio (CNR) of the lower layer.

Figure 3:
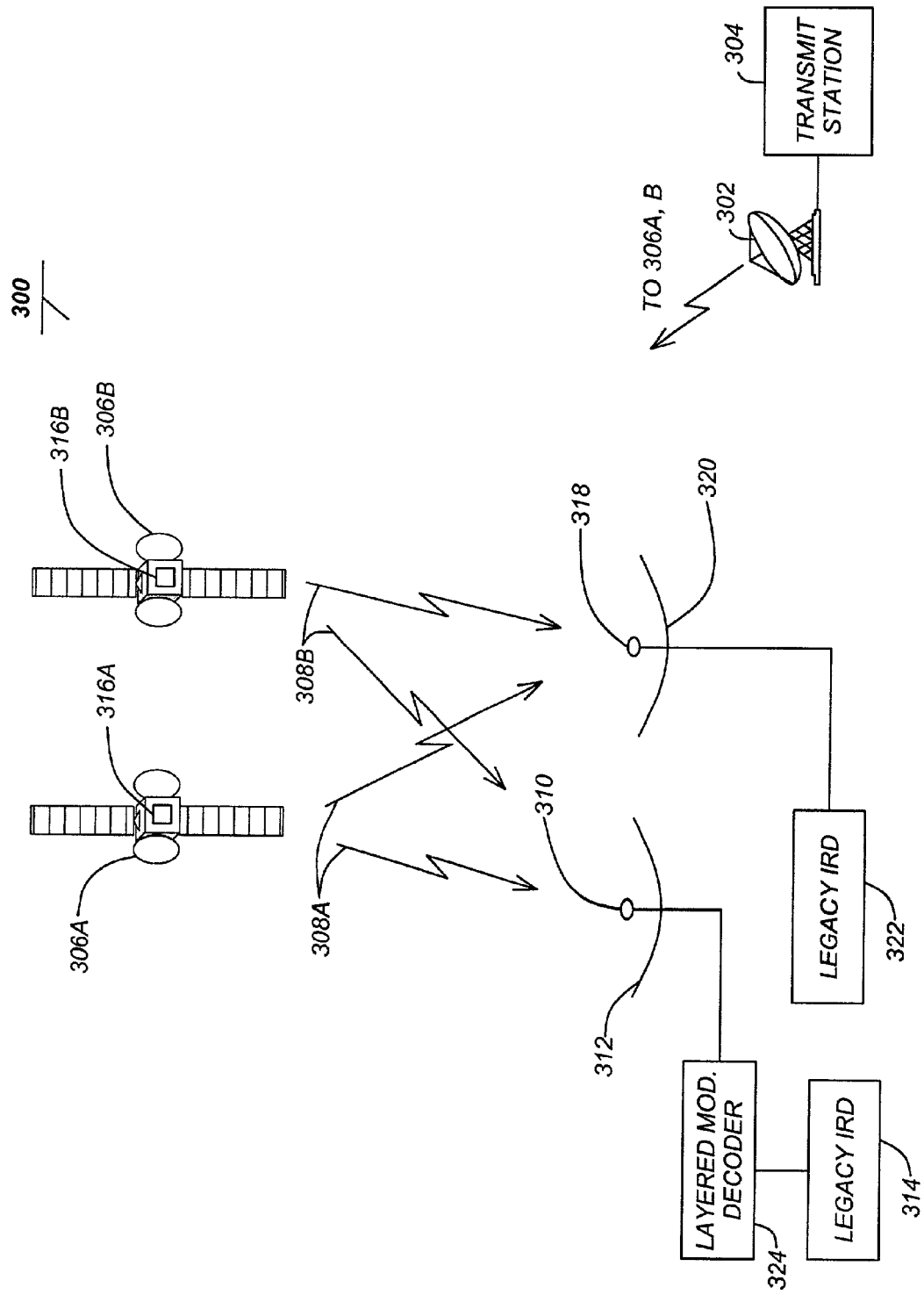
FIG. 3 is a block diagram for a typical transmission system for a receiver of the invention.

FIG. 3 is a block diagram for a typical system 300 of transmitting and receiving layered signals. Separate transmitters 316A, 316B, as may be located on any suitable platform, such as satellites 306A, 306B, are used to non-coherently transmit different layers of a signal of the present invention. It is noted that the transmitters may also be positioned on the same platform. Uplink signals are typically transmitted to each satellite 306A, 306B from one or more transmit stations 304 via an antenna 302. The layered signals 308A, 308B (downlink signals) are received at receiver antennas 312, 320 (which can alternately be a single antenna), such as satellite dishes, each with a low noise block (LNB) 310, 318 (which can likewise be a single LNB) where they are then coupled to legacy integrated receiver/decoders (IRDs) 322. One of the layered signals 308A can be distinguished and processed directly by the legacy IRD 322. Note that one satellite dish with one LNB can also be used to receive both the upper and lower layers.

With the invention, one legacy IRD 314 has the received layered signals 308A, 308B preprocessed in the layered modulation decoder 324 to separate and convert one of the layered signals 308B to a format compatible with the legacy IRDs 314, 322. It should be noted that antennas 312, 320 can each comprise more than one directional receiving dish to receive layered signals 308A, 308B from separate satellites as will be detailed in the receiver system described hereafter.

In addition, because the signal layers may be transmitted non-coherently, separate transmission layers may be added at any time using different satellites 306A, 306B or other suitable platforms, such as ground based or high altitude platforms. Thus, any composite signal, including new additional signal layers will be backwards compatible with legacy receivers which will disregard the new signal layers. To ensure that the signals are distinguishable, the combined signal and noise level for the lower layer must be at or below the allowed noise floor for the upper layer. Alternate receiver systems employing the invention described here can be constructed to decode signals having more than two signal layers.

3. Receiver System

Figure 4:
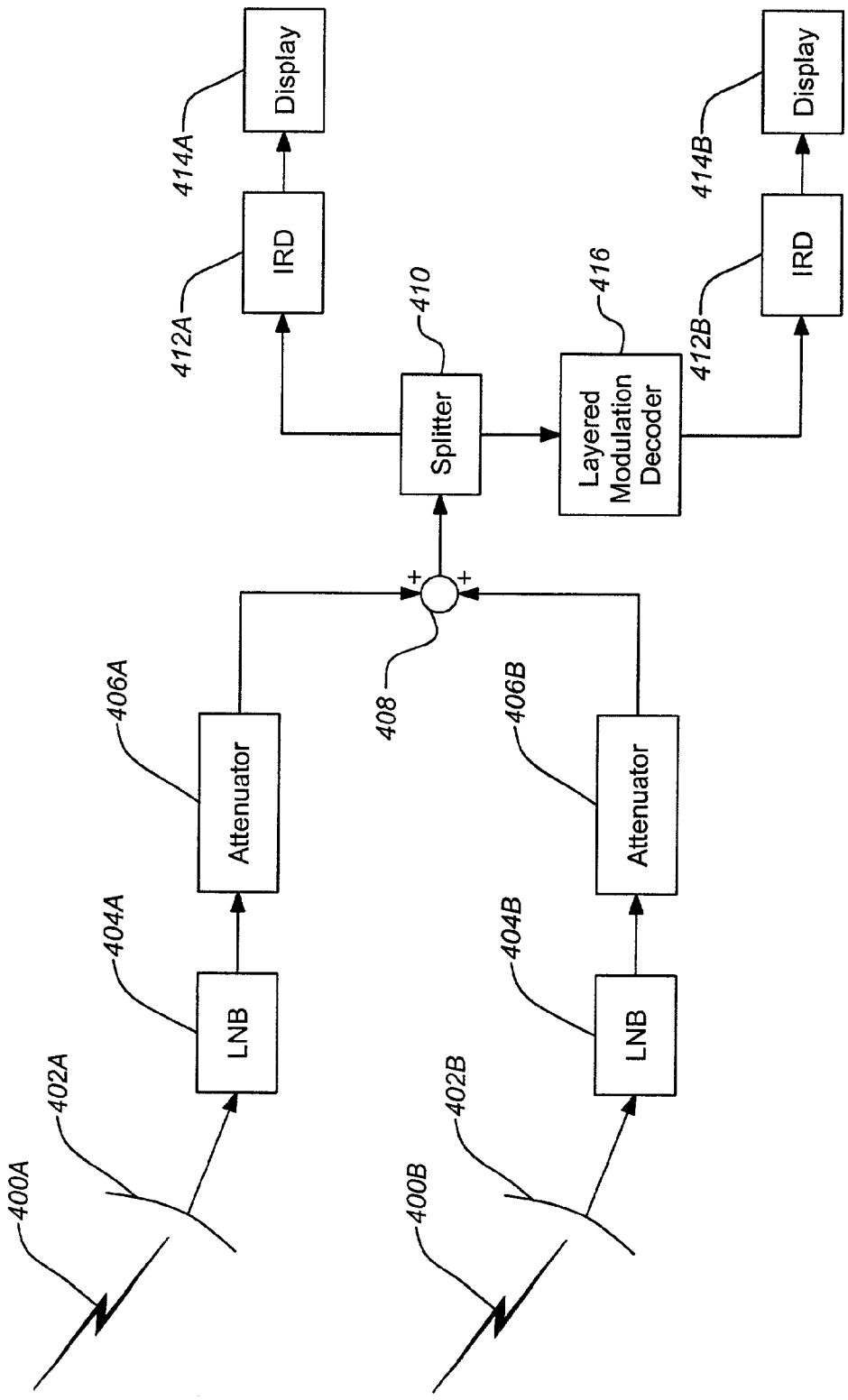
FIG. 4 is a block diagram of a receiving architecture of the invention.

FIG. 4 is a block diagram of a receiving architecture for demonstrating the invention method. Emulated layered signals 400A, 400B are received by receiving dishes 402A, 402B (which can alternately be combined in a single dish with a single LNB). The signals 400A, 400B can each be transmitted by distinct transmitters from a single or separate satellites, but they exist in interfering frequency bands, e.g. 12.5 GHz. The received layered signals 400A, 400B are then directed through respective low noise blocks (LNBs) 404A, 404B and attenuators 406A, 406B. The LNBs 404A, 404B convert each of the received layered signals 400A, 400B to an intermediate frequency range, e.g. 950–1450 MHz. The layered signals are combined at the summation block 408, with their relative power levels adjusted by the attenuators 406A, 406B.

It should be noted that the details regarding the reception of the layered signal up to the summation block 408 are not critical to the operation of the invention and shown only as one example. Many designs are possible. For example, as previously mentioned, the same receiver dish can be used for both layered signals 400A, 400B. The result of two acceptably interfering layered signals on the same input is the only requirement.

The combined layered signals 400A, 400B can then be split at splitter 410 to direct the layered signal to alternate legacy IRDs 412A, 412B. One of the legacy IRDs 412A demodulates and decodes the upper layer signal of the signals 400A, 400B and ignores the other as noise. The decoded upper layer signal is then delivered to a display 414A. The other legacy IRD 412B has the layered signals 400A, 400B preprocessed by a layered modulation decoder 416 such that the lower layer signal of the signals 400A, 400B is converted to a signal compatible with the other legacy IRD 412B (and the upper layer signal of the signals 400A, 400B is effectively filtered out). The converted lower layer signal is then demodulated and decoded by the other legacy IRD 412B and the result delivered to a display 414B. Of course, alternate architectures can employ a single display switched between signals from the separate IRDs 412A, 412B.

4. Layered Modulation Decoder

Figure 5:
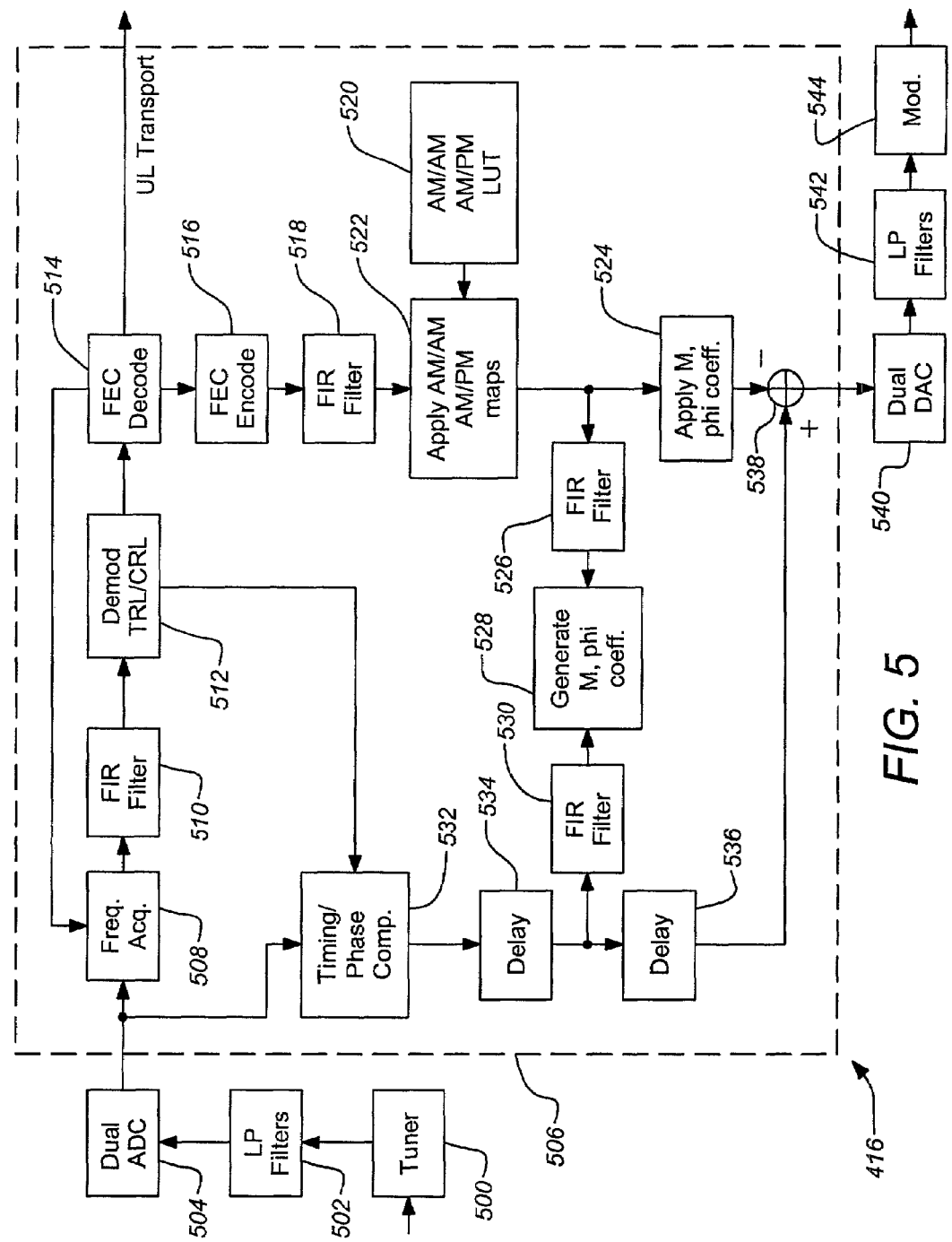
FIG. 5 is a block diagram of a layered modulation decoder of the invention.

FIG. 5 is a block diagram of a layered modulation decoder 416 of the invention. The layered modulation decoder 416 preprocesses an incoming layered signal to extract a lower layer signal and convert it to a signal that is decodable by a legacy receiver, as previously discussed.

After the splitter 410, the incoming layered signal is upper tuned to convert it to a baseband in-phase (I) and quadrature (Q) signal by tuner 500. The separate signals can then be filtered by a low pass filter 502 in preparation for digitizing. The signals are then digitized at a high sampling rate and sufficient resolution by an analog-to-digital converter (ADC) 504. A dual channel ADC 504 or separate ADCs can be used for the separate in-phase and quadrature signals. The digitized signals are then communicated to a processor 506.

The processor 506 for extracting a lower layer signal can be implemented as a logic circuit. The entering digitized in-phase and quadrature signals can be first split into two paths that will become the upper layer and composite layered signals. On the signal path for the upper layer, the in-phase and quadrature signals can first be passed through a frequency acquisition loop 508. They can then be filtered through a finite impulse response (FIR) matched filter 510. A demodulator 512 demodulates the signals, using carrier and timing recovery loops to produce demodulated layered in-phase and quadrature signals. The demodulated signals are then decoded by decoder 514 which can incorporate Viterbi decoding, deinterleaving and Reed-Solomon (RS) decoding functions as appropriate to accurately determine the upper layer symbols. The decoded upper layer symbols are then applied to an encoder 516 in order to produce an ideal upper layer signal (i.e. an upper layer signal transmitted without the noise and/or interference of the lower layer signal). The encoded signal emerges again as in-phase and quadrature signal components. A variety of signal processing techniques can be applied to these signals to produce the ideal upper layer.

The ideal upper layer signal can be filtered through an FIR matched filter 518. Characteristics of the transmission (e.g. amplifier nonlinearities, etc.) can be accounted for by signal maps 520, such as an amplitude modulation to amplitude modulation (AM/AM) map and/or an amplitude modulation to phase modulation map (AM/PM). These signal maps 520 can be updated to account for changes in the transmission characteristics of the satellite. The signal maps 520 are applied 522 to the encoded signals to simulate downlink transmission of an upper layer signal. Similarly, an additional FIR matched filter 526 can also be applied after accounting for transmission characteristics 522. In addition, an upper layer amplitude and phase matching function 528, driven by the demodulated layered signal and the ideal reconstructed upper layer signal, can also be used to generate matching coefficients. The matching coefficients are applied 524 to the reconstructed upper layer signal to ensure that it is appropriately scaled in magnitude and rotated in phase as compared to the layered signal, for maximum cancellation in the final signal subtraction.

Ultimately, the ideal reconstructed in-phase and quadrature signals for the upper layer are subtracted from the layered in-phase and quadrature signals that are produced by the demodulator at a subtractor 538. A timing and phase compensation function 532 is applied to the second layered path entering the processor 506, using information from the demodulator 512. A fixed delay 534 can be applied to the second layered signal path to determine the appropriate delay to align the layered and ideal signals to generate matching coefficients 528. The delayed layered signal is split and in one path, an FIR matched filter 530 can be applied to it before generating matching coefficients 528. The second delayed layered signal path is delayed again 536 to align it appropriately with the ideal upper layer signal for subtraction 538. The results of the subtraction are the in-phase and quadrature signals of the lower layer.

The in-phase and quadrature signals of the lower layer, output from the subtractor 538, are first converted to analog signals in an digital-to-analog converter (DAC) 540. The DAC essentially reverses the prior digitizing and therefore may use the same sampling rate and resolution. Following this, the analog form signals can be filtered by a low pass filter 542 and passed to a modulator 544 (e.g. a QPSK modulator) to produce the lower layer signal in a format for a legacy receiver to decode, as the output of the processor 416.

Figure 6:
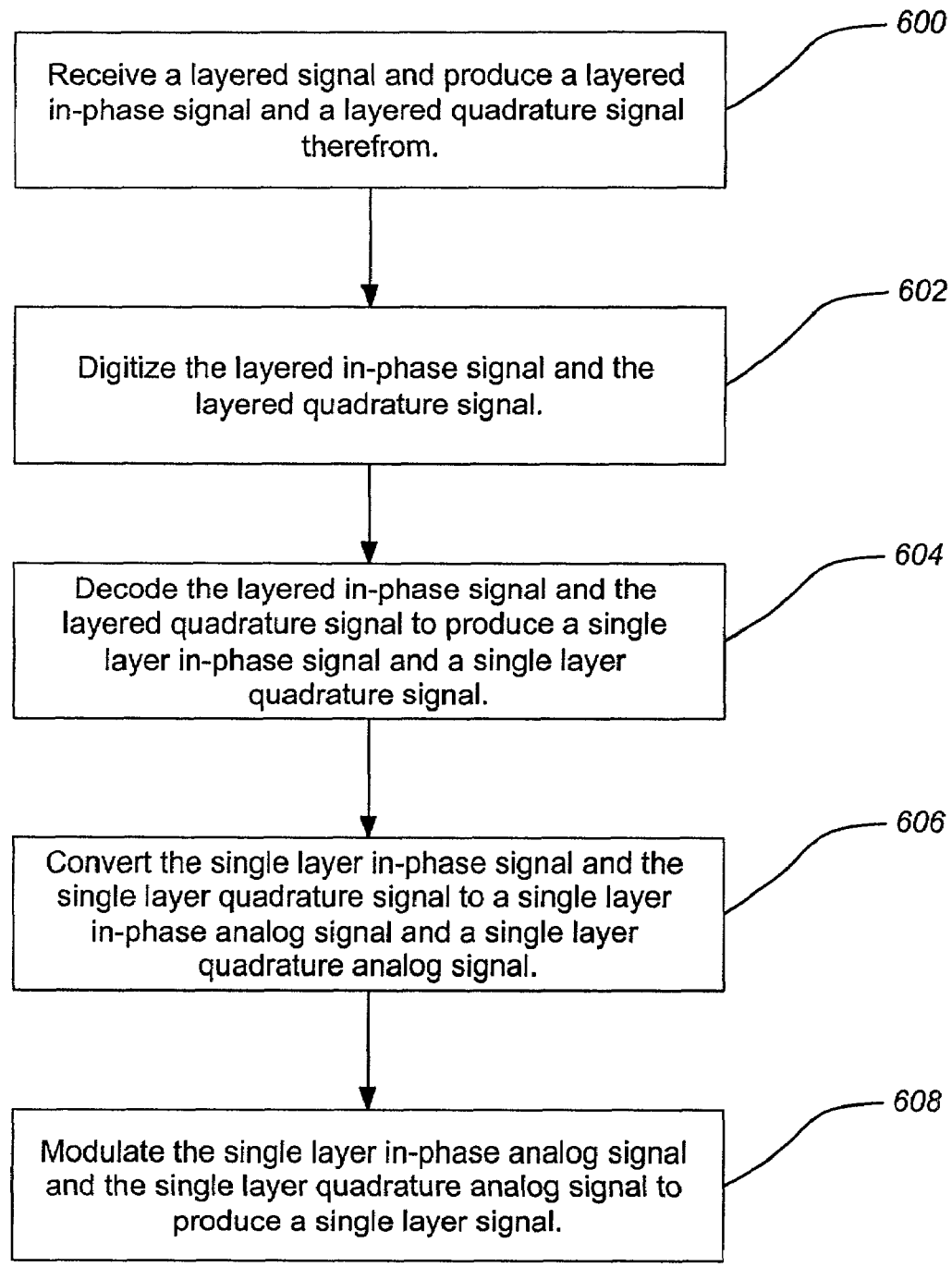
FIG. 6 is a method of a layered modulation decoding according to the invention.

FIG. 6 describes a method of a layered modulation decoding according to the invention. A layered signal is received a layered in-phase signal and a layered quadrature signal are produced from it at block 600. Next, the layered in-phase signal and the layered quadrature signal are digitized at block 602. At block 604, the layered in-phase signal and the layered quadrature signal are decoded to produce a single layer in-phase signal and a single layer quadrature signal. Then at block 606, the single layer in-phase signal and the single layer quadrature signal are converted to a single layer in-phase analog signal and a single layer quadrature analog signal. Finally, at block 608 the single layer in-phase analog signal and the single layer quadrature analog signal are modulated to produce a single layer signal.

CONCLUSION

The foregoing description including the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the invention. Since many embodiments of the invention can be made without departing from the scope of the invention, the invention resides in the claims hereinafter appended.

What is claimed is:

1. An apparatus for receiving a non-coherent layered modulation signal comprised of a sum of a first layer signal and a second layer signal, the apparatus comprising:
    a tuner for receiving the non-coherent layered modulation signal and producing a layered in-phase signal and a layered quadrature signal;
    an analog-to-digital converter for digitizing the layered in-phase signal and the layered quadrature signal;
    a processor for processing the digitized layered in-phase signal and the digitized layered quadrature signal to produce a lower layer in-phase signal and a lower layer quadrature signal, an upper layer in-phase signal and an upper layer quadrature signal, the processor comprising:
        a modulation map configured to modify the upper layer in-phase signal and the upper layer quadrature signal to account for transmission distortions of the layered modulation signal to produce an ideal upper layer in-phase signal and an ideal upper layer quadrature signal; and
        a subtractor configured to subtract the ideal upper layer in-phase signal from the digitized layered in-phase signal to produce the lower layer in-phase signal and to subtract the ideal upper layer quadrature signal from the digitized layered quadrature signal to produce the lower layer quadrature signal;
    a digital-to-analog converter for converting the lower layer in-phase signal and the lower layer quadrature signal to a lower layer in-phase analog signal and a lower layer quadrature analog signal; and
    a modulator for modulating the lower layer in-phase analog signal and the lower layer quadrature analog signal to produce a single layer signal.

2. The apparatus of claim 1, wherein the processor is adapted to produce the layered in-phase signal and the layered quadrature signal by match filtering the layered in-phase signal and the layered quadrature signal.

3. The apparatus of claim 1, wherein the lower layer signal is a legacy signal.

4. The apparatus of claim 1, wherein the processor is further configured to delay the digitized layered in-phase signal and the digitized layered quadrature signal to synchronize the subtraction of the ideal upper layer in-phase signal from the layered in-phase signal and the subtraction of the ideal upper layer in-phase signal from the layered in-phase signal.

5. The apparatus of claim 4, wherein the processor further comprises:
    a first delay element configured to apply a first delay to the digitized layered in-phase signal and the digitized layered quadrature signal;
    an amplitude and phase matching coefficient generator, configured to generate amplitude and phase matching coefficients from the digitized and first delayed layered in-phase signal, the digitized and first delayed quadrature signal, the modified upper layer in-phase signal and the modified upper layer quadrature signal;
    an amplitude and phase matcher configured to apply the amplitude and phase matching coefficients to the modified upper layer in-phase signal and the modified upper layer quadrature signal to generate the ideal upper layer in-phase signal and the ideal upper layer quadrature signal; and
    a second delay element, configured to apply a second delay to the digitized and first delayed layered in-phase signal and the digitized and first delayed layered quadrature signal to produce the delayed digitized layered in-phase signal and the delayed digitized layered quadrature signal.

6. A method of receiving a non-coherent layered modulation signal comprised of a sum of a first layer signal and a second layer signal, the method comprising the steps of:
    receiving the layered modulation signal and producing a layered in-phase signal and a layered quadrature signal;
    digitizing the layered in-phase signal and the layered quadrature signal;
    decoding the layered in-phase signal and the layered quadrature signal to produce a lower layer in-phase signal, a lower layer quadrature signal, an upper layer in-phase signal and an upper layer quadrature signal, comprising the steps of:
        modifying the upper layer in-phase signal and the upper layer quadrature signal to account for transmission distortions of the layered modulation signal to produce an ideal upper layer in-phase signal and an ideal upper layer quadrature signal;
        subtracting the ideal upper layer in-phase signal from the layered in-phase signal to produce the lower layer in-phase signal;
        subtracting the ideal upper layer quadrature signal from the layered quadrature signal to produce the lower layer quadrature signal;
    converting the lower layer in-phase signal and the lower layer quadrature signal to a lower layer in-phase analog signal and a lower layer quadrature analog signal; and
    modulating the lower layer in-phase analog signal and the lower layer quadrature analog signal to produce a single layer signal.

7. The method of claim 6, wherein the step of decoding further comprises delaying the digitized layered in-phase signal and the digitized layered quadrature signal to synchronize the subtraction of the ideal upper layer in-phase signal from the layered in-phase signal and the subtraction of the ideal upper layer in-phase signal from the layered in-phase signal.

8. The method of claim 7, wherein the step of decoding the layered in-phase signal and the layered quadrature signal comprises the steps of:
    applying a first delay to the digitized layered in-phase signal and the digitized layered quadrature signal;
    generating amplitude and phase matching coefficients from the digitized and first delayed layered in-phase signal, the digitized and first delayed quadrature signal, the modified upper layer in-phase signal and the modified upper layer quadrature signal;
    applying the amplitude and phase matching coefficients to the modified upper layer in-phase signal and the modified upper layer quadrature signal to generate the ideal upper layer in-phase signal and the ideal upper layer quadrature signal;

applying a second delay to the digitized and first delayed layered in-phase signal and the digitized and first delayed layered quadrature signal to produce the delayed digitized layered in-phase signal and the delayed digitized layered quadrature signal.

9. The method of claim 6, wherein the lower layer signal is a legacy signal.

* * * * *